United States Patent [19]

Schauer et al.

[11] 4,454,683

[45] Jun. 19, 1984

[54] TREE CLAMP

[76] Inventors: Jack E. Schauer, 78 Bradstreet Rd.; Clarence E. Schauer, 128 Maple Ave., Apt. F, both of Centerville, Ohio 45459

[21] Appl. No.: 487,933

[22] Filed: Apr. 25, 1983

Related U.S. Application Data

[63] Continuation-in-part of Ser. No. 367,634, Apr. 12, 1982, abandoned.

[51] Int. Cl.³ .............................................. A01G 23/04
[52] U.S. Cl. ....................................................... 47/76
[58] Field of Search ................ 47/73, 76, 67; 37/2 R; 414/607, 608; 294/50.7, 74, 67 DA, 67, 67 E, 67 R; 254/4 R

[56] References Cited

U.S. PATENT DOCUMENTS

| | | | |
|---|---|---|---|
| 357,197 | 2/1887 | Harsin | 47/76 |
| 388,154 | 8/1888 | Stanley et al. | 47/76 |
| 498,608 | 5/1893 | Aylworth | 47/76 |
| 621,405 | 3/1899 | Garrett | 47/76 |
| 1,139,735 | 5/1915 | Spuhr | 47/76 |
| 1,799,967 | 4/1931 | Geiger | 47/76 |
| 2,219,690 | 10/1940 | Leydecker | 47/37 |
| 2,707,846 | 5/1955 | Beseler | 47/37 |
| 3,017,719 | 1/1962 | Sigler et al. | 47/58 |
| 3,161,989 | 8/1959 | Sigler | 47/76 |
| 3,264,026 | 8/1966 | Hansen | 294/2 |
| 3,443,831 | 5/1969 | Grange | 294/76 |
| 4,073,175 | 2/1978 | Seamon | 414/607 X |

Primary Examiner—Robert E. Bagwill
Assistant Examiner—Danton DeMille
Attorney, Agent, or Firm—Biebel, French & Nauman

[57] ABSTRACT

A tree clamp, for use with a forklift truck for lifting and supporting the ball of a tree, includes a pair of essentially rigid plate members for disposition one each adjacent opposite sides of the ball. Each one of a pair of flexible connecting chains is attached at one side edge near the bottom of each plate member, and is extendable about the ball and connectable with the opposing side of the other plate member. The connecting chains are adjustable in length and cooperate with the plate members to encircle the ball. A pair of brackets is detachably mounted one on each of the forks of the lift truck, and has a hook suspended thereof. Each hook is adapted to engage with a length of chain connected with and extending along the top side edge of each plate member, whereby the plate members and the tree may be lifted and supported.

6 Claims, 3 Drawing Figures

U.S. Patent  Jun. 19, 1984  4,454,683
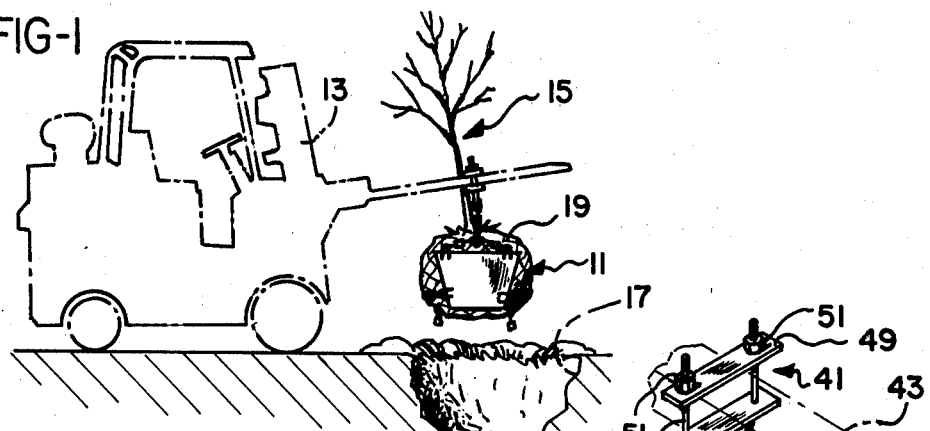
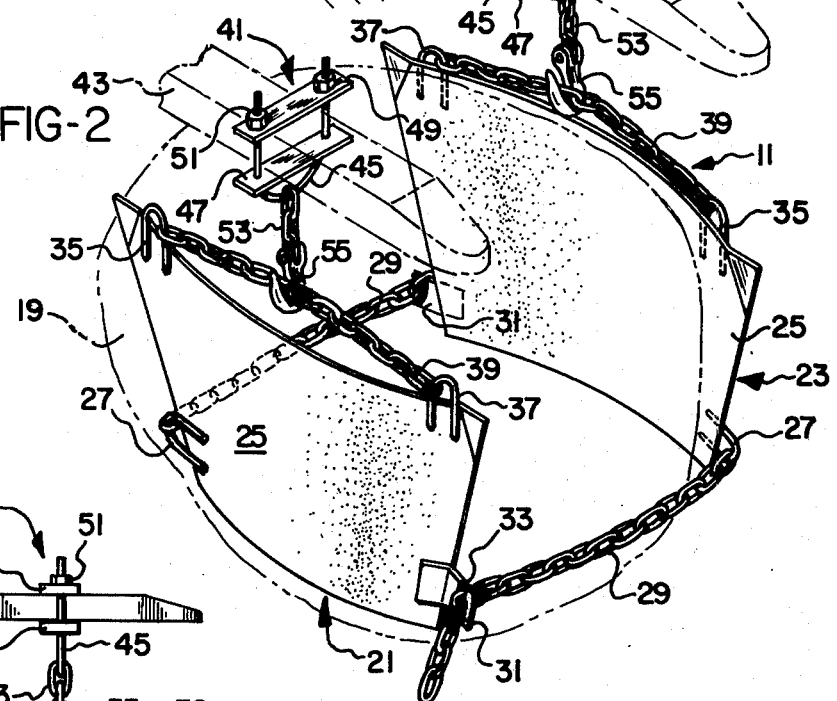
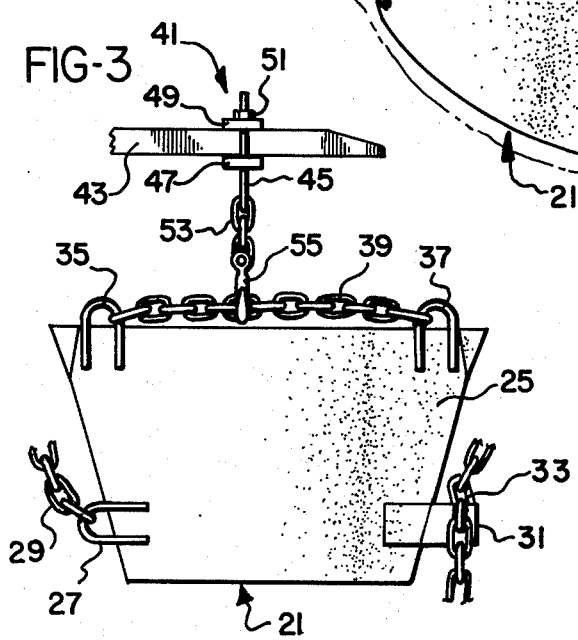

TREE CLAMP

RELATED APPLICATION

This application is a continuation-in-part application of Ser. No. 367,634, filed Apr. 12, 1982 now abandoned.

BACKGROUND OF THE INVENTION

The present invention relates to a tree clamp such as may be used in lifting, moving and transplanting trees.

Various types of apparatus have been devised for use in the lifting, moving and transplanting of trees. For example, U.S. Pat. No. 357,197, issued Feb. 8, 1887 to Harsin, illustrates one type of a device including several connectable plate members, which may be joined together to fully enclose the base of the tree, its roots, and the earth immediately surrounding them. The ground about the base of the tree is excavated, leaving a trench surrounding the base. An annular ring is clamped about the base of the trunk, and the various plate sections are fitted about the roots of the tree. The sections are connected to each other, as well as fastened to the ring about the tree trunk, thereby fully enclosing the tree base and roots within a rigid structure.

There are several disadvantages associated with the type of device illustrated by the Harsin patent. By providing for substantially full enclosure of the roots of the tree, the size of tree with which the device may be used is considerably limited. Further, by attaching each of the sections to its immediately adjoining sections, as well as to a central ring, the attachment and removal of the device is relatively complex. Additionally, no ready means for removing the tree from the ground following installation of the device is provided, short of dragging the tree from the excavation.

In U.S. Pat. No. 2,707,846, issued May 10, 1955 to Beseler, a sling for use in transplanting trees is disclosed. In using the sling, the earth about the tree is again excavated, so as to leave the tree base, roots and earth surrounding them in the form of a ball. A plurality of vertically extending flexible strap members are placed about the ball, and are joined together at their bottom ends by a combination of additional flexible straps and lengths of chain. Each vertical strap further has a ring at its upper end, and a chain is threaded through each ring, tightened and connected to itself such that the sling completely encircles the ball of the tree. A yoke member is then connected to the upper chain along one side of the tree trunk. The yoke is connected to a winch, crane, or the like for lifting the tree from the ground.

While the Beseler device overcomes one disadvantage of the Harsin device in that it is readily adaptable to any size tree, it too possesses several disadvantages. Depending on the size of the tree to be moved, the proper number of vertical straps must be connected together in an approximately equally spaced relationship. Further, the upper chain must be threaded through the rings of the vertical straps, and must be securely tightened about the ball. Thus, positioning of the sling is a relatively time-consuming process. Further, lifting the tree by the single yoke will result in the tree pivoting about the yoke as it is lifted from the ground. This can result in tree branches moving against the chain or cable connecting the yoke to the lifting mechanism, or against nearby obstacles, potentially causing broken branches and damage to the tree. Additionally, by having the tree in a non-vertical alignment and freely pivotal while lifted, accurate positioning of the tree at the transplant site is made more difficult.

A third device for use with a method of transplanting trees is shown in U.S. Pat. No. 3,017,719, issued Jan. 23, 1962 to Sigle et al. The disclosed apparatus represents a portion of a vehicle, which includes a lifting mechanism substantially similar to that found on a standard lift truck. A vertically movable platform is provided, to which is mounted a support for a plurality of vertically extendable blades. The vehicle may be moved into place so that the blades surround the tree to be transplanted, whereupon the blades may be either oscillated or fully rotated about the tree. As the blades cut into the earth, they are extended downwardly, such that they effectively sever the tree base, roots and earth surrounding them from the remainder of the ground. The platform may then be lifted, whereupon the blades lift the tree from the ground.

Because the operation of the Sigler et al apparatus is performed substantially completely by the machine, it does possess the advantage of ease of operation. It will be readily recognized, however, that the relative complexity of the machinery results in an expensive piece of equipment, a serious disadvantage in comparison to the other disclosed devices. Further, the care and maintenance of the equipment is also significantly greater.

What is needed, therefore, is a device for supporting a tree to enable its lifting during the transplanting of the tree. Such a device should be relatively simple to use, and should be capable of relatively quick attachment to and disconnection from the tree. The device should be capable of use with a wide range of tree sizes. The device should also be useable in conjunction with a readily available lifting mechanism for lifting the tree in a stable manner. Further, the device should be of relatively low cost, and require relatively little care and maintenance.

SUMMARY OF THE INVENTION

The present invention discloses a device for supporting a tree wherein the trunk base and roots thereof define a ball. The disclosed tree clamp includes a pair of essentially rigid plate members adapted for disposition one each adjacent the ball on opposite sides thereof, and a pair of connecting members which are flexible but not resilient, e.g., a form of chain or cable. Each such connecting member is attached at one end to one side edge near the bottom of one of the plate members. The connecting member is extendable about the ball of the tree, and is connectable with the opposing side edge of the other plate member, such that the connecting members and plate members cooperate to encircle the ball. A means for supporting the plate members is also provided, whereby the ball may be lifted, connected with the plate members near the top of each.

Each of the flexible connecting members may be a length of chain, and preferably has an adjustable connection to at least one of the plate members whereby the effective length of the chain can be adjusted. Further, each essentially rigid plate member may define a portion of a concave surface, with the plate members disposed such that the concave surface is adjacent the ball.

Typically, the tree clamp is used to lift a tree by means of a forklift truck. The device includes a pair of brackets detachably mounted one each on each of the forks of the truck, with a hook suspended from each of the brackets, and a pair of lengths of chain, each length being connected at its opposite ends to extend loosely substantially along the top edge of one of the plate members. Each of the hooks in turn is adapted to be engageable with one each of the lengths of chain.

Accordingly, it is an object of the present invention to provide a tree clamp for supporting a tree having a trunk base and roots defining a ball, including a pair of essentially rigid plate members disposed adjacent the ball, a pair of flexible connecting members detachably connecting the lower side edges of the plate members, and means for supporting the plate members whwereby the ball may be lifted; to provide such a tree clamp that is relatively simple and quick to attach to and remove from the ball of the tree, even within an excavation during removal of a tree; to provide such a tree clamp that is relatively inexpensive; and to provide such a clamp that may be used with an unmodified forklift truck.

Other objects and advantages of the invention will be apparent from the following description, the accompanying drawings and the appended claims.

BRIEF DESCRIPTION OF THE DRAWINGS

FIG. 1 is a side view illustrating generally use of the tree clamp of the present invention in lifting a tree by a forklift truck;

FIG. 2 is a perspective view of the tree clamp; showing its attachment to the ball of a tree and to the forks of a forklift truck; and FIG. 3 is a side view of a single plate member and a bracket of the tree clamp.

DETAILED DESCRIPTION OF THE PREFERRED EMBODIMENT

Referring now to the drawings, and in particular to FIG. 1, a tree clamp 11 is provided for use in conjunction with a standard forklift truck 13. The clamp 11 enables the truck 13 to remove or place a tree 15 from or into an excavation 17 within the ground. The clamp 11 is adapted to be fastenable about the ball 19 of tree 15, which includes the trunk base and roots of tree 15, as well as normally a certain amount of earth immediately surrounding the roots. Typically, the ball 19 will have been bound and covered with burlap prior to fastening of clamp 11 to the ball 19.

The structure of the tree clamp 11 may be seen by reference to FIG. 2. Clamp 11 includes two substantially identical clamp halves 21 and 23 which are disposed one each adjacent the ball 19 on opposite sides thereof. Each clamp half 21 and 23 includes a plate member 25 that is essentially rigid and is formed from a flat piece of material, preferably a metal such as steel. A concave surface is defined by each rigid plate member 25, with each being placed adjacent ball 19 so that the concave surface of the plate member 25 faces ball 19. The members 25, when in position, therefore approximate the surface of that portion of ball 19 against which members 25 are placed, although it should be noted, as seen from FIG. 2, that the members 25 do not exactly conform to the ball surface. Each plate member 25 is generally tapered from top to bottom whereby each plate member 25 has downwardly converging side edges providing a bottom edge of less length than its top edge. Further, each plate member 25 is of a width approximately equal to its height so that the two positioned plate members 25 cover a substantial portion, although not all, of the ball surface, again shown in FIG. 2.

Referring to FIG. 3, clamp half 21 further includes a U-shaped anchor member 27 attached along one side edge near the bottom of plate member 25. A flexible, but essentially non-extensible, connecting member, formed from a length of chain 29, is attached at one end thereof to anchor member 27. A slotted member 31 is attached near the bottom of the side edge of plate member 25 opposite anchor member 27. Slotted member 31 includes a slot 33 which is adapted to receive one link of chain as will be described below.

An additional pair of U-shaped anchor members or hangers 35 and 37 are attached to the top edge near each side edge of plate member 25. A length of chain 39 is permanently connected between anchor members 35 and 37, and preferably is slightly greater in overall length than the space between the anchor members.

It will be understood that clamp half 23 is structurally identical to clamp half 21, thus like reference numerals are applied to like parts.

Referring again to FIG. 2, the tree clamp 11 further includes a pair of brackets 41, one each detachably mounted to each fork 43 of the lift truck 13. Each bracket 41 includes a U-bolt 45 to which a plate 47 is fixedly attached. A second plate 49 is placed upon U-bolt 45 such that it is freely movable up and down along U-bolt 45. To attach bracket 41 to the fork 43 of lift truck 13, the fork 43 is inserted between plates 47 and 49. A pair of nuts 51 are placed one upon each end of U-bolt 45 and are fastened against plate 49, thereby clamping bracket 41 to fork 43.

A short length of chain 53 is attached to each U-bolt 45, so as to hang downwardly when bracket 41 is in place on fork 43. A hook 55 is attached to the bottom end of chain 53.

The use of the clamp 11, described as follows, may be understood by generally referring to the drawings. Initially, an excavation 17 is dug out around the base and roots of a tree 15, so as to define a ball 19 therefor. Clamp halves 21 and 23 are inserted into the excavation 17, one each adjacent the ball 19 on opposite sides thereof. Chain 29 of clamp half 21 is extended about ball 19, and one link of chain 29 is inserted into slot 33 of slotted member 31 of clamp half 23, with the next outer link functioning, especially as the chain is placed in tension, to latch the chain to member 31. Similarly, chain 29 of clamp half 23 is extended about ball 19, pulled taut, and inserted into slot 33 of slotted member 31 of clamp half 21. The lower part of ball 19 is thereby encircled by plate members 25 and chains 29.

As shown in FIG. 2, chains 29 provide the sole means of interconnection between plate members 25; as a result, the top edges of plate members 25 are unconnected and freely movable. As ball 19 is lifted with clamp 11, as described below, the combination of the tapered shape of plate member 25, the interconnection thereof by chains 29, and the lack of connection at the top edges of plate members 25 all cooperate to facilitate pulling the bottom edges of plate members 25 partially beneath the lower part of ball 19.

Lift truck 13, with a bracket 41 attached to each fork 43, is moved toward tree 15 such that the forks 43 pass on opposite sides of the trunk. The forks 43 are lowered such that each hook 55 may be engaged with one of the chains 39. Brackets 41, hooks 55, and chains 39 effectively function as a support means for each plate member 25, as well as a means for connecting each plate member 25 to a fork 43 of the lift truck 13. Forks 43 may then be raised, whereby the tree 15 is lifted from the excavation 17.

Preferably, chains 39 are each provided with an odd number of links, so that the mid-points of chains 39 may be easily located. Normally, engaging each hook 55 with the center link of each chain 39 will result in the tree 15 being lifted in a substantially upright position. In the event the tree 15 is not balanced, such that it begins to pivot upon lifting, the hooks 55 may be readjusted along the links of chains 39 to properly balance the tree 15.

It will be recognized that the tree 15, once lifted by truck 13, may be transported thereby to the site at which the tree 15 is to be transplanted. Since the tree 15 is carried by a device suspended at only two points, much as in carrying a basket, the tree may be transported over relatively rough terrain and up and down inclines with the tree remaining in an upright, balanced position.

After transportation, the tree 15 may then be lowered into a previously prepared excavation and transplanted by the reverse of the steps set forth above. It is pointed out, moreover, that the ease with which a tree 15 may be lifted through use of the present invention enables the tree 15 to be lifted and repositioned in the new excavation in the event that adjustment of its original positioning is needed.

The chains 29 can easily be released from members 31, once the ball 19 is resting in the excavation. The forks 43 are slightly further lowered to relieve tension in the chains, enabling hooks 55 to be disengaged.

It will be further recognized that by constructing the clamp 11 of sufficient size, with chains and other hardware of sufficient strength, and by using the clamp 11 with a lift truck 13 or other vehicle of sufficient lifting capacity, that even relatively large trees may be transplanted using the clamp 11 as described herein. Regardless of the size of tree, however, clamp 11 will be formed from the two clamp halves 21 and 23 and thus will not require more than the two plate members 25 described herein. Moreover, a large range of tree sizes can be accommodated by any given clamp 11 of the type described herein. These features greatly enhance the versatility and ease of operation of the clamp.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tree clamp for use in supporting a tree having a trunk base and roots defining a ball, comprising:

not more than two essentially rigid plate members for disposition adjacent the ball with said members on opposite sides thereof, each of said plate members being formed with a downward taper so that said plate member had downwardly converging side edges providing a bottom edge of less length than its top edge, said plate members being further formed of a shape and size so as to cover only a portion of the ball surface;

a pair of flexible non-resilient connecting members, each said connecting member being attached at one end thereof to one side edge near the bottom edge of one of said plate members, with said connecting member being extendable about the ball and connectable with an opposing side edge of the other of said plate members, said connecting members providing the sole means of interconnection between said plate members whereby the top edges thereof are unconnected and freely movable, said tapered plate members and said connecting members cooperating to facilitate pulling the bottom edges of said plate members partially beneath the lower part of the ball; and suspending means including a second pair of flexible non-resilient connecting members, each said member of said second pair being connected at each of its ends to one of said plate members substantially near the top of one of said plate members to extend along the upper edge and substantially between the side edges thereof, and a pair of hooks, each engageable with one of said members of said second pair.

2. The tree clamp as defined in claim 1, wherein each said essentially rigid place member is of a width approximately equal to its height.

3. The tree clamp as defined in claim 2, wherein each said flexible connecting member is a length of chain.

4. The tree clamp as defined in claim 2, wherein each said essentially rigid plate member defines a portion of a concave surface, said surface being disposed adjacent the ball.

5. A tree clamp, for use in lifting and supporting with a forklift truck a tree having a trunk and roots defining a ball, comprising:

not more than two essentially rigid plate members for disposition adjacent the ball with said members on opposite sides thereof, each of said plate members being formed with a downward taper so that said plate member has downwardly converging side edges providing a bottom edge of less length than its top edge, said plate members being further formed of a shape and size so as to cover only a portion of the ball surface;

a pair of flexible non-resilient connecting members, each said connecting member being attached at one end thereof to one side edge near the bottom edge of one of said plate members, with said connecting member being extendable about the ball and connectable with an opposing side edge of the other of said plate members, said connecting members providing the sole means of interconnection between said plate members whereby the top edges thereof are unconnected and freely movable, said tapered plate members and said connecting members cooperating to facilitate pulling the bottom edges of said plate members partially beneath the lower part of the ball; and means for suspending each of said plate members near the top edge thereof from a fork of a forklift truck, said suspending means including a second pair of flexible non-resilient connecting members, each member of said plate member substantially near the top of one of said plate members to extend along the upper edge and substantially between the side edges thereof, and a pair of hooks, each engageable with one of said connecting members of said second pair.

6. A tree clamp as defined in claim 5, wherein said suspending means further includes a pair of brackets, one of said brackets being detachably mountable on each of the forks, and one of said hooks suspended from each of said brackets, said hooks being adapted for suspending therefrom said plate members.

* * * * *

UNITED STATES PATENT AND TRADEMARK OFFICE
CERTIFICATE OF CORRECTION

PATENT NO. : 4,454,683
DATED : June 19, 1984
INVENTOR(S) : Schauer et al

It is certified that error appears in the above-identified patent and that said Letters Patent is hereby corrected as shown below:

Column 1, line 66, "nearly" should be --nearby--.

Column 2, line 5, "Sigle" should be --Sigler--.

Column 3, line 10, "whwereby" should be --whereby--.

Column 6, line 19, "place" should be --plate--.

Column 6, line 57, insert --said-- after "each".

Column 6, line 58, insert --second pair being connected at each of its ends to one of said-- after "said".

Signed and Sealed this

Fifteenth Day of January 1985

[SEAL]

Attest:

Attesting Officer

GERALD J. MOSSINGHOFF

Commissioner of Patents and Trademarks